(12) United States Patent
Subramanian et al.

(10) Patent No.: US 7,754,126 B2
(45) Date of Patent: Jul. 13, 2010

(54) INTERLAMINAR TENSILE REINFORCEMENT OF SIC/SIC CMC'S USING FUGITIVE FIBERS

(75) Inventors: Suresh Subramanian, Mason, OH (US); James Dale Steibel, Mason, OH (US); Douglas Melton Carper, Trenton, OH (US)

(73) Assignee: General Electric Company, Schenectady, NY (US)

( * ) Notice: Subject to any disclaimer, the term of this patent is extended or adjusted under 35 U.S.C. 154(b) by 1392 days.

(21) Appl. No.: 11/155,190

(22) Filed: Jun. 17, 2005

(65) Prior Publication Data

US 2006/0284337 A1 Dec. 21, 2006

(51) Int. Cl.
*B29C 70/40* (2006.01)
*C04B 35/64* (2006.01)
*F01D 5/14* (2006.01)

(52) U.S. Cl. .................. 264/258; 29/889.71; 264/610

(58) Field of Classification Search ................. 264/258, 264/DIG. 44, 313, 610; 29/889.71; 416/230
See application file for complete search history.

(56) References Cited

U.S. PATENT DOCUMENTS

| | | | |
|---|---|---|---|
| 2,948,950 A * | 8/1960 | Finger et al. ................. | 442/208 |
| 3,533,813 A | 10/1970 | Geltman | |
| 4,257,157 A * | 3/1981 | Pollock et al. ................. | 29/611 |
| 4,546,032 A * | 10/1985 | Vasilos ........................ | 428/223 |
| 4,725,567 A | 2/1988 | Hillig | |
| 4,810,442 A | 3/1989 | Hillig et al. | |
| 4,981,822 A | 1/1991 | Singh et al. | |
| 5,015,540 A * | 5/1991 | Borom et al. ............... | 428/698 |
| 5,043,303 A | 8/1991 | Singh et al. | |
| 5,067,998 A | 11/1991 | Singh et al. | |
| 5,160,676 A | 11/1992 | Singh et al. | |
| 5,250,243 A | 10/1993 | Allaire et al. | |
| 5,387,299 A | 2/1995 | Singh et al. | |
| 5,389,321 A | 2/1995 | Bansal | |

(Continued)

FOREIGN PATENT DOCUMENTS

EP 0 317 129 A1 5/1989

(Continued)

OTHER PUBLICATIONS

Brennan, J.J., Interfacial characterization of a slurry-cast melt-infiltrated SiC/SiC ceramic-matrix composite, Acta Meterialia, vol. 48, No. 18-19 (2000), pp. 4619-4628.*

(Continued)

*Primary Examiner*—Matthew J. Daniels
(74) *Attorney, Agent, or Firm*—McNees Wallace & Nurick, LLC (57) ABSTRACT

A method of manufacturing a turbine engine component is disclosed. The method includes the steps of providing a plurality of ceramic cloth plies, each ply having woven ceramic fiber tows and at least one fugitive fiber tow, laying up the plurality of plies in a preselected arrangement to form a turbine engine component shape, oxidizing the fugitive fibers to produce fugitive fiber void regions in the ply, rigidizing the component shape to form a coated component preform using chemical vapor infiltration, partially densifying the coated component preform using carbon-containing slurry, and further densifying the coated component preform with at least silicon to form a ceramic matrix composite turbine engine component having matrix rich regions.

14 Claims, 6 Drawing Sheets

U.S. PATENT DOCUMENTS

| | | | |
|---|---|---|---|
| 5,407,740 A | 4/1995 | Jessen | |
| 5,476,623 A * | 12/1995 | Ohtsubo | 264/610 |
| 5,488,017 A | 1/1996 | Szweda et al. | |
| 5,654,246 A | 8/1997 | Newkirk et al. | |
| 5,858,513 A | 1/1999 | Jessen | |
| 5,866,244 A | 2/1999 | Jessen | |
| 6,030,698 A | 2/2000 | Burchell et al. | |
| 6,103,337 A | 8/2000 | Burgess | |
| 6,254,975 B1 | 7/2001 | Kayser et al. | |
| 6,258,737 B1 | 7/2001 | Steibel et al. | |
| 6,280,550 B1 | 8/2001 | Steibel et al. | |
| 6,291,057 B1 | 9/2001 | Fujita | |
| 6,309,994 B1 | 10/2001 | Marra et al. | |
| 6,316,083 B1 | 11/2001 | Kawabata et al. | |
| 6,447,893 B2 | 9/2002 | Hanzawa et al. | |
| 6,555,211 B2 | 4/2003 | Moody | |
| 2002/0076541 A1 | 6/2002 | Jarmon et al. | |

FOREIGN PATENT DOCUMENTS

| | | |
|---|---|---|
| EP | 0 825 163 A1 | 2/1998 |
| EP | 0 926 111 A2 | 6/1999 |
| EP | 1 028 097 A2 | 8/2000 |
| EP | 1 028 099 A1 | 8/2000 |
| JP | 4-160059 | 3/1992 |
| WO | WO 87/04659 | 8/1987 |
| WO | WO 9828241 * | 7/1998 |
| WO | WO 01/98566 A1 | 12/2001 |
| WO | WO 02/26658 A1 | 4/2002 |

OTHER PUBLICATIONS

Lee, S.P. et al, Microstructural and mechanical characteristics of SiC/SiC composites with modified-RS process, Journal of Nuclear Materials, vol. 289 (2001), pp. 30-36.*

* cited by examiner

INTERLAMINAR TENSILE REINFORCEMENT OF SIC/SIC CMC'S USING FUGITIVE FIBERS

STATEMENT REGARDING FEDERALLY SPONSORED RESEARCH OR DEVELOPMENT

The United States Government retains license rights in this invention and the right in limited circumstances to require the patent owner to license others on reasonable terms by the terms of Government Contract No. N00421-00-3-0536 awarded by the Department of the Navy.

RELATED APPLICATIONS

This Application is related to application Ser. No. 11/155,786 filed on even date with this Application entitled "THROUGH THICKNESS REINFORCEMENT OF SiC/SiC CMC's THROUGH IN-SITU MATRIX PLUGS MANUFACTURED USING FUGITIVE FIBERS" which is also assigned to the assignee of the present invention and which is hereby incorporated by reference in its entirety.

FIELD OF THE INVENTION

The present invention relates generally to ceramic matrix turbine engine components, and more particularly, to a ceramic matrix composite turbine blade.

BACKGROUND OF THE INVENTION

In order to increase the efficiency and the performance of gas turbine engines so as to provide increased thrust-to-weight ratios, lower emissions and improved specific fuel consumption, engine turbines are tasked to operate at higher temperatures. As the higher temperatures reach and surpass the limits of the material comprising the components in the hot section of the engine, and in particular, the turbine section of the engine, new materials must be developed.

As engine operating temperatures have increased, new methods of cooling the high temperature alloys comprising the combustors and the turbine airfoils have been developed. For example, ceramic thermal barrier coatings (TBCs) were applied to the surfaces of components in the stream of the hot effluent gases of combustion to reduce the heat transfer rate and to provide thermal protection to the underlying metal and allow the component to withstand higher temperatures. These improvements helped to reduce the peak temperatures and thermal gradients. Cooling holes were also introduced to provide film cooling to improve thermal capability or protection. Simultaneously, ceramic matrix composites were developed as substitutes for the high temperature alloys. The ceramic matrix composites (CMCs) in many cases provided an improved temperature and density advantage over the metals, making them the material of choice when higher operating temperatures were desired.

A number of techniques have been used in the past to manufacture turbine engine components, such as turbine blades using SiC/SiC ceramic matrix composites (CMC) formed from 2-D ceramic fiber plies. However, such materials have inherently low interlaminar properties. The primary cause of the low interlaminar strength is the presence of a boron nitride (BN) layer that is typically included between the fiber and the ceramic matrix to increase fracture toughness. In many of the hot section applications, such as combustor liners, high pressure turbine blades, high pressure turbine vanes, low pressure turbine (LPT) blades and low pressure turbine vanes, the thermal gradients and mechanical loads that result from normal engine operation result in significant local interlaminar stresses. Ideally, the CMC component would be designed such that the component had enhanced interlaminar strength in local high stress areas of many of these applications.

One technique of manufacturing CMC turbine blades is the method known as the slurry cast melt infiltration (MI) process. A technical description of a slurry cast MI method is described in detail in U.S. Pat. No. 6,280,550 B1, which is assigned to the Assignee of the present invention and which is incorporated herein by reference. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. By "silicon carbide-containing fiber" is meant a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide. These examples are given for demonstration of the term "silicon carbide-containing fiber" and are not limited to this specific combination. Other fiber compositions are contemplated, so long as they include silicon carbide.

A major challenge in this approach is the low interlaminar strength between the interface of the fibers with the ceramic matrix. Cracks initiate and propagate more easily by linking to adjacent tows. The low interlaminar strength diminishes the ability of the CMC component to endure significant local interlaminar stresses.

One approach to solve the problem of low interlaminar strength in CMC's has been the use of through thickness fiber reinforcement. Approaches known in the art as T-forming and Z-pinning have been used to introduce load carrying fibers in the through thickness direction of CMC fiber plies at an angle to the plane of the plies to enhance interlaminar strength. However, these methods substantially reduce in-plane mechanical properties and result in significant increases in fiber preforming costs.

What is needed is a method of manufacturing CMC turbine engine components using a slurry cast MI process that increases interlaminar strength without substantially reducing in-plane mechanical properties.

SUMMARY OF THE INVENTION

Accordingly, it may be desirable to increase interlaminar strength by breaking or interrupting the weak link path of adjacent tows to produce matrix rich regions that are resistant to crack initiation and propagation.

This can be achieved according to embodiments of the present invention, which provide a method of manufacturing a turbine engine component having a plurality of matrix regions between fiber tows, comprising the steps of providing a plurality of ceramic cloth plies, each ply comprising a plurality of tows, wherein the tows include ceramic fiber tows and wherein at least one ply includes oxidizable fugitive fiber tows. The method further comprises laying up the plurality of plies in a preselected arrangement to form a turbine engine component shape, oxidizing the fugitive fibers to produce fugitive fiber void regions in the ply, rigidizing the component shape to form a coated component preform using chemical vapor infiltration, partially densifying the coated component preform using carbon-containing slurry, and further densifying the coated component preform with at least silicon to form a ceramic matrix composite turbine engine component having matrix rich regions.

An advantage of the present invention is that a matrix rich region results that interrupts the proximity of the weaker fiber-matrix interfaces leading to improved mechanical properties and improved fracture toughness of the composite.

Another advantage of the present invention is that fugitive fibers can easily be incorporated into the weave and then burned off to create a ceramic weave having fugitive fiber void regions that are filled with ceramic material during subsequent manufacturing operations to provide the matrix rich regions in the composite.

Another advantage of the present invention is that the matrix rich regions of the composite arrests crack propagation which might otherwise follow the interface of the matrix and fibers of the ceramic weave.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
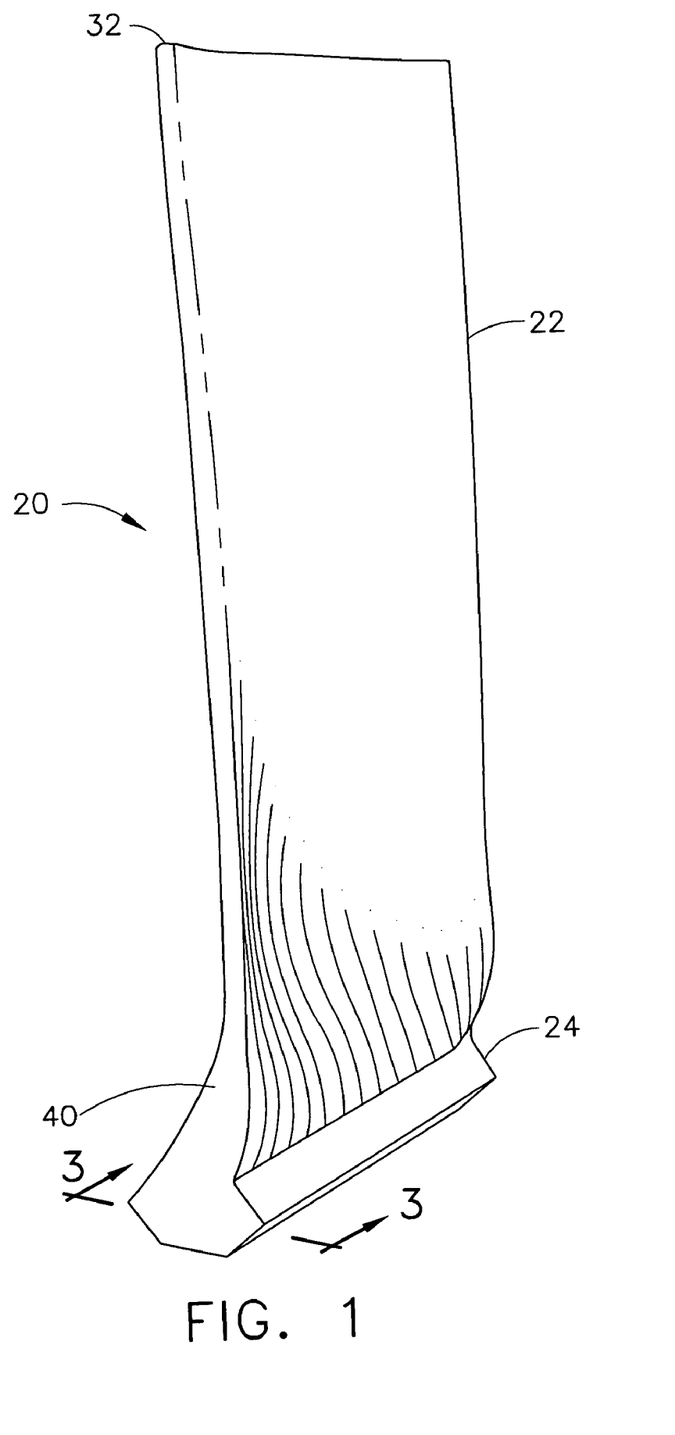
FIG. 1 is an exemplary LPT blade of an aircraft engine.

FIG. 1 depicts an exemplary aircraft engine LPT blade 20. In this illustration a turbine blade 20 comprises a ceramic matrix composite material. The turbine blade 20 includes an airfoil 22 against which the flow of hot exhaust gas is directed. The turbine blade 20 is mounted to a turbine disk (not shown) by a dovetail 24 that extends downwardly from the airfoil 22 and engages a slot of similar geometry on the turbine disk. The LPT blade 20 made according to methods of the present invention typically includes an integral platform (not shown) between the dovetail 24 and the airfoil. A separate platform which not an important aspect of the method of the present invention, is provided to minimize the exposure of the dovetail 24 to hot gases of combustion. The airfoil may be described as having a root end 40, and an oppositely disposed tip end 32.

Figure 2:
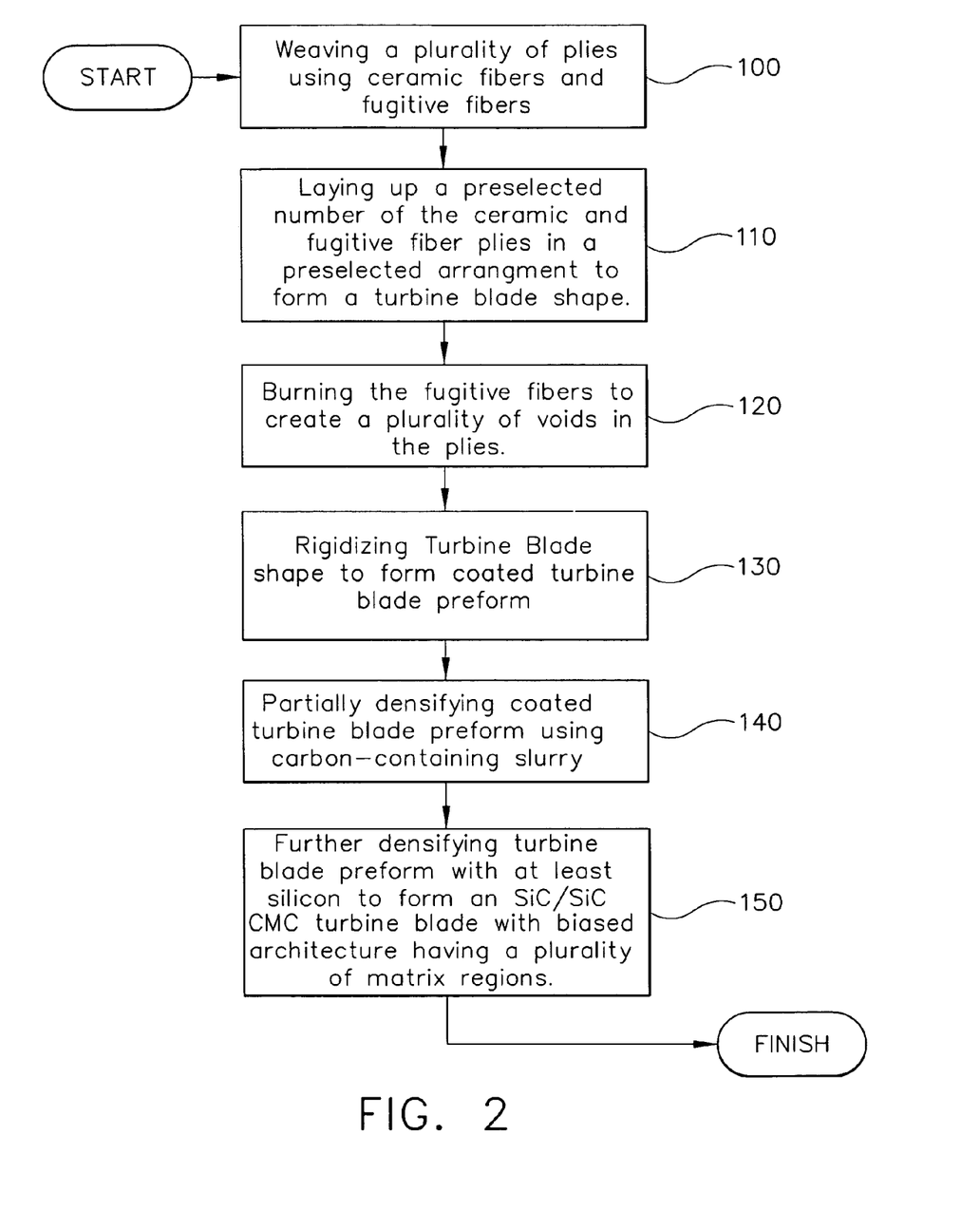
FIG. 2 is a flow chart illustrating a slurry cast MI method of manufacture of the present invention to produce a CMC turbine blade.

Referring now to FIG. 2 there is shown a flow chart illustrating a slurry cast MI method of manufacture of the present invention to produce a CMC turbine blade having a plurality of matrix rich regions. The initial step 100 of the process provides a two-dimensional (2D) woven cloth comprising ceramic fiber tows and fugitive fibers tows, the cloth having two weave directions at substantially 90° angles to each other. Preferably the ceramic fibers are silicon carbide (SiC)-containing ceramic fibers. "Fugitive fibers" refer to fibers of any material that are capable of being oxidized while leaving little to no charring or residue. It will be appreciated that a "tow," as used herein, refers to a single fiber or to a loose strand of essentially untwisted fibers that can be woven into a fiber bundle in the same manner as a single fiber. The fiber bundle acts substantially in the same manner as a single fiber.

The woven cloth may be a balanced cloth, with substantially the same number of fibers running in both directions. Alternatively, the woven cloth may be a biased cloth, having more fibers running in the warp direction than the weft direction. Weaving may be accomplished using conventional looms using a continuous weave. Denier of the ceramic tow is about 1800, with the fugitive fiber selected to approximately match the volume of the ceramic tow. The number ratio of fugitive to ceramic fibers typically ranges from about 1:7 to about 1:1. Preferably, the ratio of fugitive to ceramic fibers is the same in both the warp and the weft directions.

Next, at step 110, a preselected number of the ceramic and fugitive fiber containing ceramic cloth plies of a preselected geometry are layed up in a preselected arrangement to form a turbine blade shape.

As the outermost region of a turbine blade dovetail has known regions of localized higher tensile stress in the direction of the long dimension or axis of the turbine blade during engine operation, the fact that biased cloth plies have a greater tensile strength in the warp direction than in the weft direction may be used in the selection of the orientation of the outermost plies of the turbine blade shape. A preselected number of the outermost plies of the turbine blade shape are laid up at an orientation of about 0° so that the plies that pass through regions of localized higher tensile stress have more fiber tows that run in the loading direction of the stresses than the opposite direction. The outermost plies that lie within the regions of localized higher tensile stress must have more plies laid up at an orientation of about 0° than laid up in other orientations. Such orientation increases the directional strength of the final CMC component. By "0° orientation", it is meant that the ceramic and fugitive fiber containing cloth is laid up so that the warp direction of the cloth is in the line of the axis of the turbine blade as known in the art. A 90° orientation means that the cloth is laid up so that the warp direction of the cloth is in the line perpendicular to the long axis of the turbine blade as known in the art. Orientations other than 0° and 90° may be negative or positive depending on whether the ply is rotated clockwise (positive) from a preselected plane or axis in the long dimension of the turbine blade or rotated counterclockwise (negative) from the preselected plane in the long dimension of the turbine blade as known in the art. The remaining plies that do not pass through the regions of localized higher tensile stress may be arranged in any appropriate orientation as known in the art. For example, the remaining plies could all be laid up in an alternating formation such that the remaining plies are at about a 45° orientation, followed by about a −45° orientation, followed by about a 45° orientation, followed by a −45° orientation, etc. as is known in the art, or such that the remaining plies are at a −45° orientation, followed by a 0° orientation, followed by a +45° orientation, followed by a 90°, or in any other mechanically acceptable arrangement.

In addition, it is well known in the art that the high cycle fatigue (HCF) response of a turbine blade is controlled by the modulus of the material used to manufacture the turbine blade. As the biased fabric allows control over the directional tensile strength of the CMC turbine blade on a ply by ply basis, the weave of the individual plies can be controlled, and the plies may be laid up so that the modulus of elasticity of the densified CMC turbine blade is such that the critical modes of vibration in the CMC turbine blade are not within the operating range of the turbine engine. In addition, the lower number of cross-over points in the fabric result in enhanced in-plane mechanical properties as more of the fiber tows are oriented in a more linear direction.

Once the plies are laid up, the next step 120 entails burning the fugitive fibers to create a plurality of fugitive fiber void regions. The fugitive fibers are selected to produce minimal to no residue upon burning. The material comprising the fugitive fiber tows can comprise any material that is combustible at a temperature lower than about 1000° C., provided that the products of the combustion of the fugitive fiber tows do not adversely impact the properties of the final CMC component. In a preferred embodiment, the material comprising the fugitive fiber tows is an organic material, preferably selected from the group consisting of cotton, rayon, nylon, and combinations thereof. To achieve little or no post-oxidation residue of the fugitive fibers, the cloth ply is burned in an oxygen rich environment at a temperature of about 700° C. to about 800° C. for about 100 minutes. As a result, the fugitive fibers are oxidized to combustion byproducts such as carbon dioxide and water, leaving a void in the space where the fugitive fibers previously existed. The ceramic fibers are not oxidized and remain in essentially the same condition as prior to the oxidization.

The next step 130 entails rigidizing the turbine blade shape by applying at least one of BN and SiC coatings using a chemical vapor infiltration (CVI) process as is known in the art, forming a rigid coated turbine blade preform. The use of a larger number of fibers running in the warp direction of the cloth reduces the number of fiber cross-over points in the fabric, which enables more consistently uniform coatings of BN and SiC. In addition, the use of biased ceramic and fugitive fiber containing cloth results in fiber tow spreading during the step of rigidizing as the tows are not held as tightly together as they are in balanced ceramic cloth. Such spreading, however, is not so extensive as to cause the fabric to lose its form. The spreading facilitates more uniform coating of the fibers with BN and SiC. Such uniform coating provides the final CMC component with improved mechanical properties, including improved modulus of elasticity, improved tensile strength, and improved fracture toughness.

The next step 140 is partially densifying the coated turbine blade preform by introducing a carbon-containing slurry, as is known in the art, into the porosity of the coated turbine blade preform. The slurry will fill the fugitive fiber void regions that resulted from burning off the fugitive fibers. The final step 150 is further densifying the turbine blade preform with at least silicon, and preferably boron doped silicon, through an MI process, as known in the art, forming a CMC turbine blade, which according to a preferred embodiment is a SiC/SiC CMC turbine blade with biased architecture. Upon final densification, the slurry that filled the fugitive fiber void regions hardens to provide a matrix rich region that results in a local interruption in the proximity between fiber-matrix interfaces, thus making the turbine blade more resistant to crack initiation and propagation.

Figure 3:
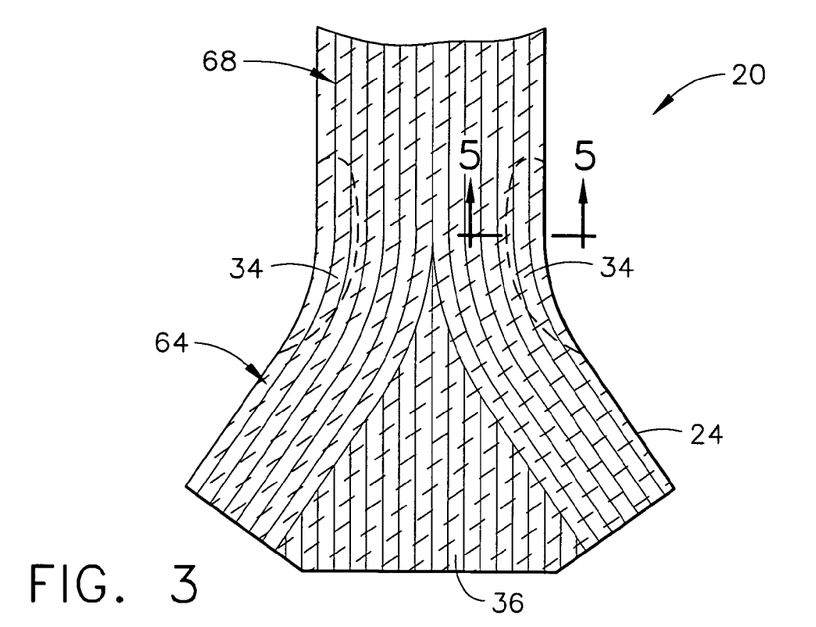
FIG. 3 is a cross-sectional view of a CMC LPT blade dovetail of the present invention manufactured using a slurry cast MI method of manufacture.

FIG. 3 illustrates an example of a cross-sectional view of a CMC LPT blade 20 dovetail 24 of an embodiment of the present invention manufactured with the slurry cast MI process. The two higher tensile stress regions 34 and the lower tensile stress region 36 are evident. A dashed line shows the separation between the stress regions 34 and 36. The blade 20 comprises a plurality of plies 64 within an interstitial ceramic matrix 68.

Figure 4A:
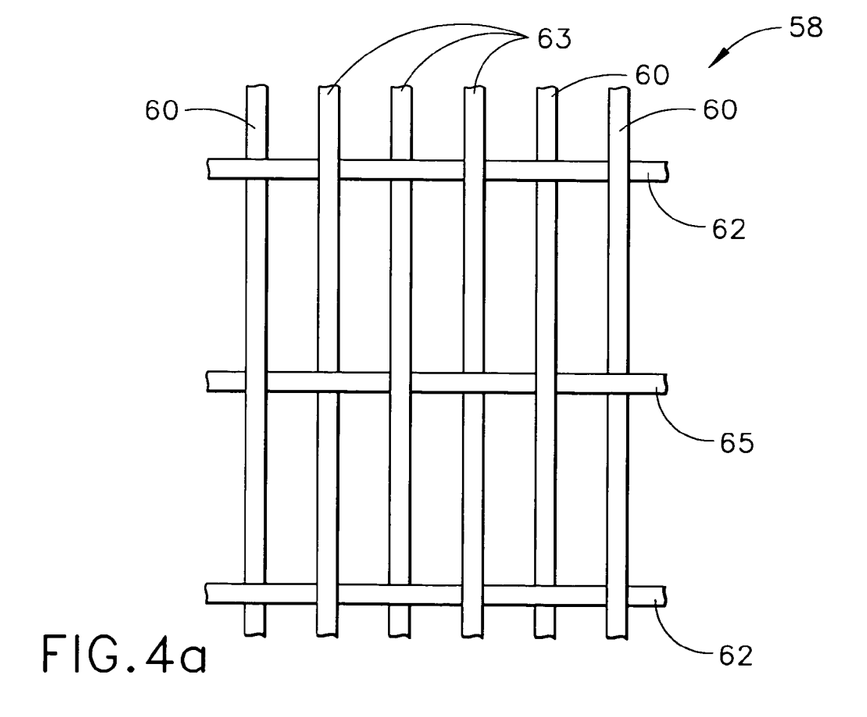
FIG. 4a is a portion of a biased ceramic and fugitive fiber ply used in the manufacture of the slurry cast MI method of CMC component manufacture.
Figure 4B:
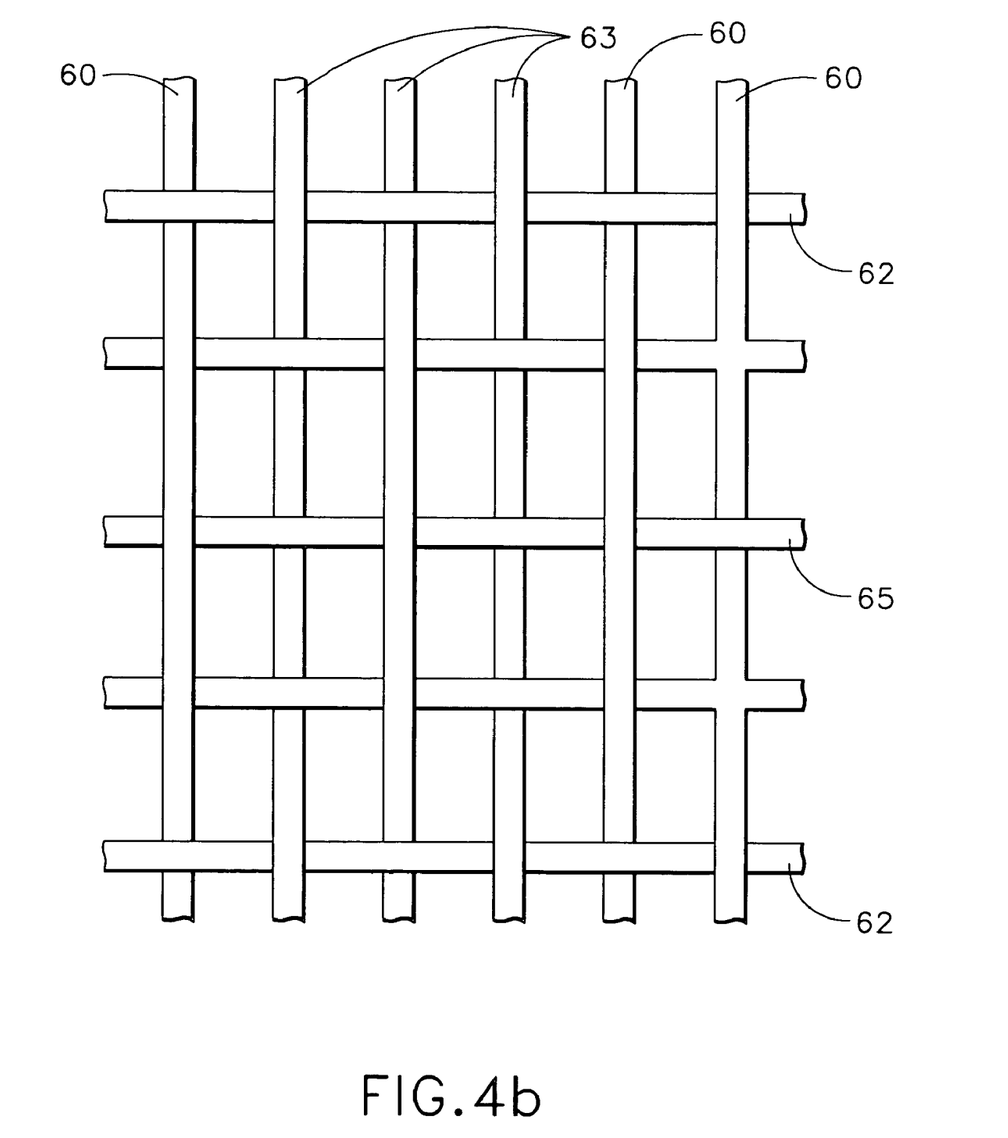
FIG. 4b is a portion of a balanced ceramic and fugitive fiber ply used in the manufacture of the slurry cast MI method of CMC component manufacture.

FIG. 4a shows an example of a portion of a single biased ceramic and fugitive fiber cloth ply 64 prior to lay up. According to a preferred embodiment, the ply 64 is a biased ceramic and fugitive fiber cloth ply 64 that comprises more warp ceramic tows 60 than weft ceramic tows 62. Typically the ratio is at least 2 warp tows 60 to every weft tow 62. The ply 64 also comprises warp fugitive tows 63 and weft fugitive tows 65 interwoven with the ceramic tows 60, 62. A balanced cloth ply may also be used, as illustrated in FIG. 4b, in which a substantially equal number of tows run in both the warp and the weft direction.

Figure 5:
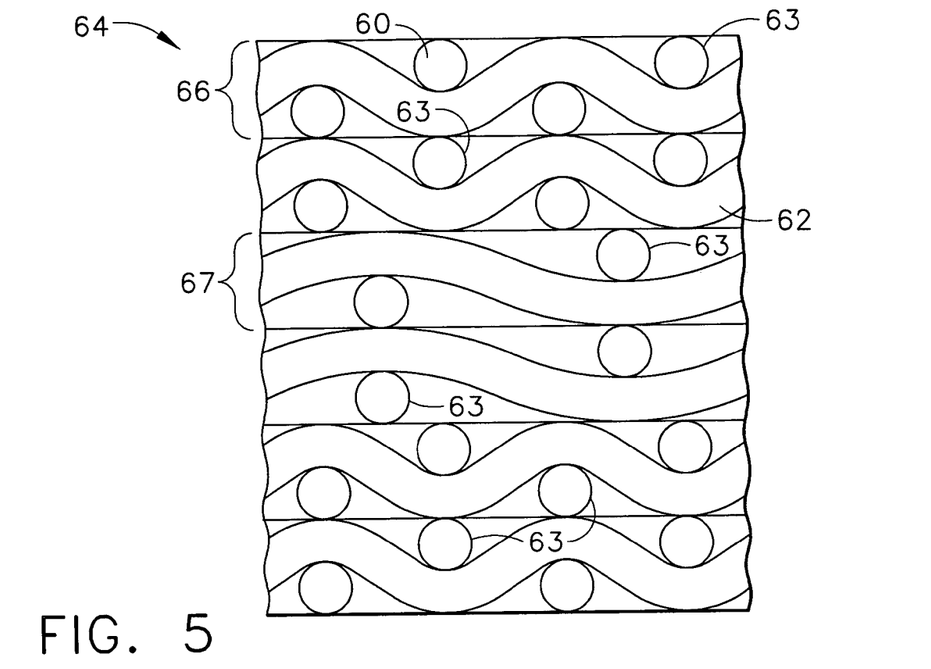
FIG. 5 is a cross-sectional view of the CMC LPT blade dovetail of FIG. 3 showing the outermost plies of the dovetail after the laying up of the plies.
Figure 6:
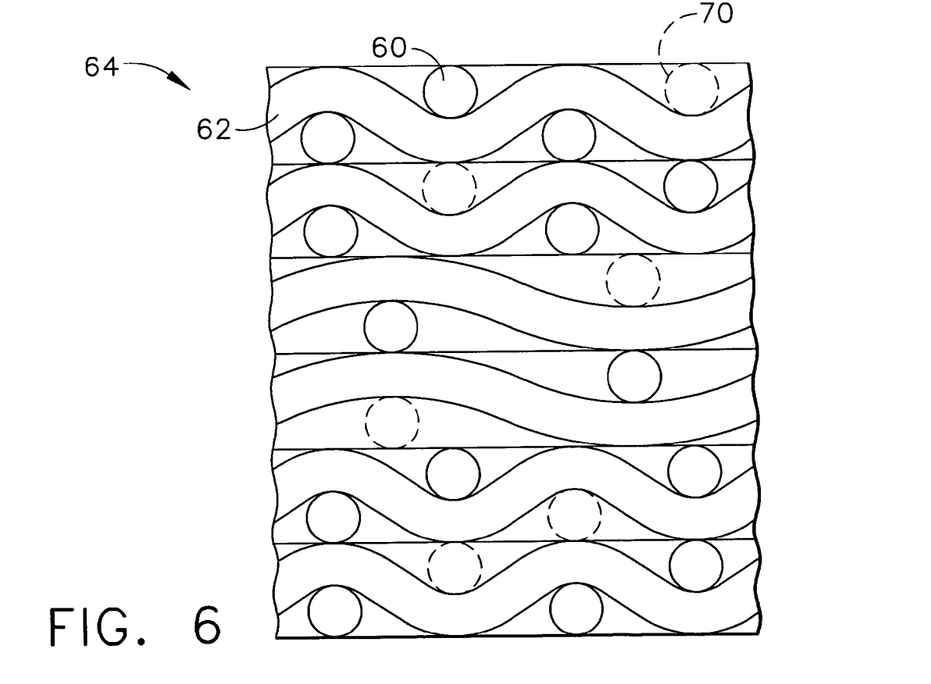
FIG. 6 is a cross-sectional view of the CMC LPT blade dovetail of FIG. 3 showing the outermost plies of the dovetail after fugitive fibers have been oxidized.

FIG. 5 is a cross-section of the outermost plies 64 within the higher tensile stress region 34 taken at line 5-5 in FIG. 3 after layup, but before the fugitive fibers are burned and the blade is rigidized, thus the interstitial ceramic matrix 68 of FIG. 3 is not present in this illustration. As can be seen in FIG. 5, more of the plies 64 are 0° oriented plies 66 than are 90° oriented plies 67. Each ceramic and fugitive fiber containing ply 64 comprises warp ceramic tows 60 and weft ceramic tows 62, as well as warp fugitive fiber tows 63 and weft fugitive fiber tows 65 (not shown). After layup, the fugitive fiber tows 63 are oxidized and thus are no longer present in the ply 64, as shown by the phantom lines in FIG. 6, leaving a fugitive fiber void region 70.

Figure 7:
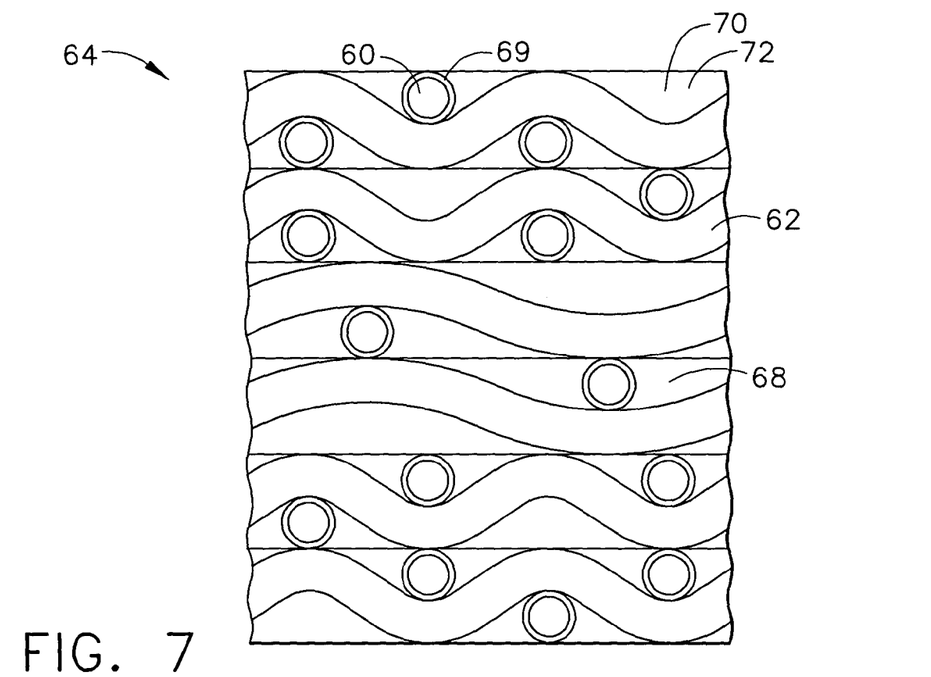
FIG. 7 is a cross-sectional view of the CMC LPT blade dovetail of FIG. 3 showing the outermost plies of the dovetail in a finished blade having matrix rich regions following rigidizing and densifying.

Referring now to FIG. 7, rigidizing the blade provides a ceramic coating 69, typically of SiC and BN, over the ceramic tows 60, 62 of the plies 64. Because the cloth plies 64 are porous, the slurry fills the porous cloth plies 64, resulting in an interstitial ceramic matrix 68 between the ceramic tows 60, 62 and the plies 64. The fugitive fiber void region 70 resulting from oxidation of the fugitive fibers results in localized pooling of slurry, providing a matrix rich region 72 in which the ceramic matrix 68 has a larger, uninterrupted volume than in other areas of the plies 64 in which the ceramic tows 60, 62 remain.

Figure 8:
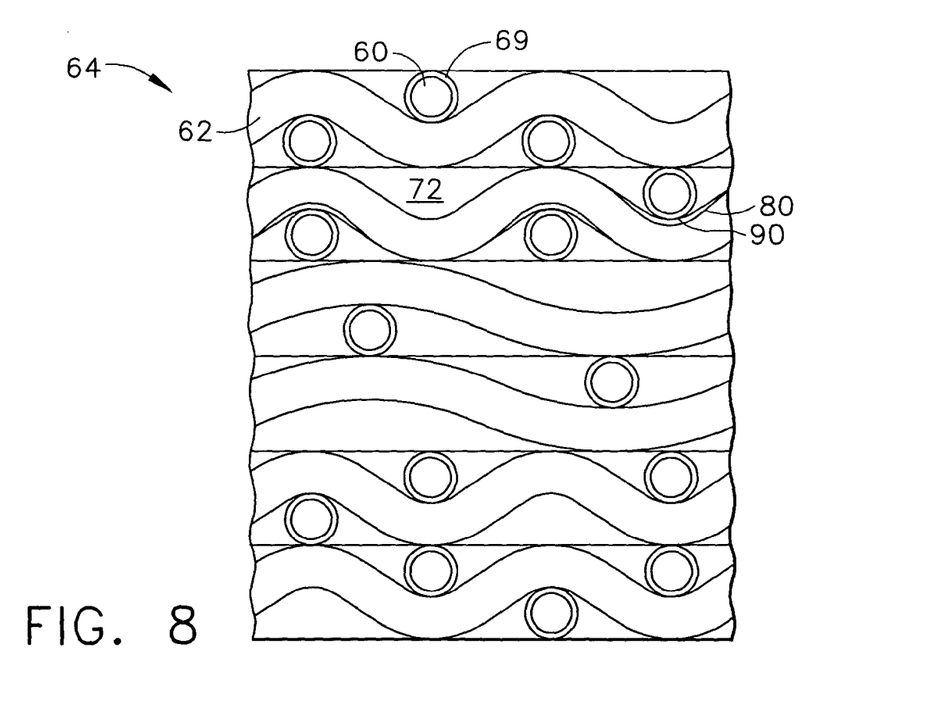
FIG. 8 is a cross-sectional view of the CMC LPT blade dovetail of FIG. 3 showing the outermost plies of the dovetail in a finished blade showing crack arrest properties of the matrix rich regions.

The close proximity of the ceramic fibers to one another provides strength for the blade but also provides an inherent weak point for crack initiation and for crack growth after the crack has initiated. As shown in FIG. 8, a crack 80 tends to follow the weak interface 90 between the ceramic tows 60, 62 and the ceramic matrix 68. However, as also shown in FIG. 8, the matrix rich regions provide a local area within the ply 64 in which ceramic fibers are not in close proximity to one another. Thus, when a crack 80 reaches a matrix rich region 72, no inherent weak point is present, and the crack 80 must propagate, if at all, directly through the ceramic matrix 68 without the benefit of a weak point, inhibiting continued growth of the crack.

While exemplary embodiments of the invention have been described with respect to a LPT blade, it should be appreciated that the invention is not so limited and that the present invention also includes any ceramic matrix composite turbine engine component, such as a turbine blade, a cooled turbine nozzle, or an uncooled turbine nozzle, wherein the component is initially laid up in a preselected arrangement using a preselected number of biased and/or balanced ceramic and fugitive fiber cloth plies. The ceramic cloth may be silicon carbide containing cloth.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manufacturing a turbine engine component comprising the steps of:
   providing a plurality of ceramic cloth plies, each ply comprising a plurality of tows, wherein the tows include ceramic fiber tows and wherein at least one ply further includes fugitive fiber tows;
   laying up the plurality of plies in a preselected arrangement to form a turbine engine component shape;
   oxidizing the fugitive fiber tows to produce fugitive fiber void regions in the at least one fugitive fiber containing ply; and
   after the steps of laying up and oxidizing, slurry casting the component by steps comprising:
      rigidizing the component shape to form a coated component preform using chemical vapor infiltration;
      partially densifying the coated component preform using carbon-containing slurry; and
      further densifying the coated component preform with at least silicon to form a ceramic matrix composite turbine engine component having matrix rich regions,
   wherein the step of providing a woven ceramic cloth comprises providing a woven ceramic cloth having at least one ply with more tows in a warp direction than a weft direction and wherein the ratio of fugitive fibers to ceramic fibers is the same in both the warp and weft directions.

2. The method of claim 1, wherein the ratio of tows in the warp direction of the provided woven ceramic cloth to the tows in the weft direction of the provided woven ceramic cloth is at least about 2:1.

3. The method of claim 1, wherein the step of oxidizing the fugitive fiber tows is performed in an oxygen-containing atmosphere at a temperature in the range of about 700° C. to about 800° C., for about 100 minutes.

4. The method of claim 1, wherein the fugitive fibers tows comprise materials selected from the group consisting of cotton, rayon, nylon, and combinations thereof.

5. The method of claim 1, wherein the ratio of ceramic fiber tows to fugitive fiber tows is in the range of about 1:1 to about 7:1.

6. The method of claim 1, wherein the plies are silicon carbide containing plies.

7. The method of claim 1, wherein the turbine engine component is a turbine blade.

8. The method of claim 1, wherein the turbine engine component is an uncooled turbine blade.

9. The method of claim 1, wherein the turbine engine component is a cooled turbine blade.

10. The method of claim 1, wherein the turbine engine component is a cooled turbine nozzle.

11. The method of claim 1, wherein the turbine engine component is an uncooled turbine nozzle.

12. The method of claim 1, wherein the step of rigidizing further comprises applying a layer of BN and a layer of SiC to the plies using chemical vapor infiltration.

13. A method of manufacturing a turbine engine component comprising the steps of:
   providing a plurality of ceramic cloth plies, each ply comprising a plurality of tows, wherein the tows include ceramic fiber tows and fugitive fiber tows, the number of tows in a warp direction greater than the number of tows in a weft direction;
   laying up the plurality of plies in a preselected arrangement to form a turbine engine component shape;
   oxidizing the fugitive fiber tows to produce fugitive fiber void regions in the fugitive-fiber containing ply; and
   after the steps of laying up and oxidizing, slurry casting the component by steps comprising:
      rigidizing the component shape with at least one layer of comprising a material selected from the group consisting of BN, SiC and combinations thereof to form a coated component preform using chemical vapor infiltration;
      partially densifying the coated component preform using carbon-containing slurry; and
      further densifying the coated component preform with at least silicon to form a ceramic matrix composite turbine engine component having matrix rich regions;
   wherein the ratio of fugitive fibers to ceramic fibers is the same in both the warp and weft directions.

14. A method of manufacturing a turbine engine component comprising the steps of:
   providing a plurality of ceramic cloth plies, each ply comprising a plurality of tows, wherein the tows include ceramic fiber tows and wherein at least one ply further includes fugitive fiber tows, the ply having more tows in a warp direction than a weft direction with the same number of fugitive fiber tows in the warp direction as the weft direction;
   laying up the plurality of plies in a preselected arrangement to form a turbine engine component shape;
   oxidizing the fugitive fiber tows to produce fugitive fiber void regions in the at least one fugitive fiber containing ply; and
   after the steps of laying up and oxidizing, slurry casting the component by steps comprising:
      rigidizing the component shape to form a coated component preform using chemical vapor infiltration;
      partially densifying the coated component preform using carbon-containing slurry; and
      further densifying the coated component preform with at least silicon to form a ceramic matrix composite turbine engine component having matrix rich regions.

* * * * *